(12) United States Patent
Li et al.

(10) Patent No.: US 8,577,216 B2
(45) Date of Patent: Nov. 5, 2013

(54) AUTO-FOCUS CALIBRATION FOR IMAGE CAPTURE DEVICE

(75) Inventors: Jingqiang Li, San Diego, CA (US); Szepo Robert Hung, San Diego, CA (US); Chinchuan Andrew Chiu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 706 days.

(21) Appl. No.: 12/030,827

(22) Filed: Feb. 13, 2008

(65) Prior Publication Data
US 2009/0202235 A1   Aug. 13, 2009

(51) Int. Cl.
   G03B 3/00    (2006.01)
   G03B 13/00   (2006.01)

(52) U.S. Cl.
   USPC .......................................... 396/125; 348/366

(58) Field of Classification Search
   USPC ............ 396/102, 125, 89, 103, 133; 348/354, 348/356, 345, 348, 366
   See application file for complete search history.

(56) References Cited

U.S. PATENT DOCUMENTS

| | | | | |
|---|---|---|---|---|
| 4,470,683 | A | * | 9/1984 | Nakajima ...................... 396/102 |
| 4,575,212 | A | * | 3/1986 | Kitaura et al. ................. 396/102 |
| 5,325,146 | A | * | 6/1994 | Toji ................................ 396/81 |
| 5,694,168 | A | * | 12/1997 | Toji ............................... 348/350 |
| 6,826,361 | B1 | * | 11/2004 | Yost .............................. 396/97 |
| 7,433,586 | B2 | * | 10/2008 | Onozawa ...................... 396/121 |
| 2004/0109081 | A1 | * | 6/2004 | Sumi ............................. 348/345 |
| 2005/0128340 | A1 | * | 6/2005 | Ikeda ............................ 348/345 |
| 2006/0038017 | A1 | * | 2/2006 | Carlson et al. ............ 235/462.24 |
| 2006/0104623 | A1 | | 5/2006 | Sasaki et al. |
| 2006/0109369 | A1 | * | 5/2006 | Yamazaki ..................... 348/345 |
| 2006/0109370 | A1 | * | 5/2006 | Yamazaki ..................... 348/345 |
| 2006/0133791 | A1 | * | 6/2006 | Miyata .......................... 396/103 |

(Continued)

FOREIGN PATENT DOCUMENTS

| | | |
|---|---|---|
| JP | 2005173269 A | 6/2005 |
| JP | 2006098589 A | 4/2006 |
| JP | 2007279659 A | 10/2007 |
| JP | 2008020710 A | 1/2008 |

OTHER PUBLICATIONS

Li, Jingqiang et al., "Predictive Focus Value Calculation for Image Capture Devices," U.S. Appl. No. 11/533,620. Application pending. Filed Sep. 20, 2006.

(Continued)

*Primary Examiner* — Clayton E LaBalle
*Assistant Examiner* — Warren Fenwick
(74) *Attorney, Agent, or Firm* — Matthew J. Evans; James R. Gambale, Jr.

(57) ABSTRACT

The disclosure relates to techniques for calibration of an auto-focus process in an image capture device. The techniques may involve calibration of a lens actuator used to move a lens within a search range during an auto-focus process. For example, an image capture device may adjust reference positions for the search range based on lens positions selected for different focus conditions. The different focus conditions may include a far focus condition and a near focus condition. The focus conditions may be determined based on a detected environment in which the device is used. Detection of an indoor environment may indicate a likelihood of near object focus, while detection of an outdoor environment may indicate a likelihood of far object focus. An image capture device may detect indoor and outdoor environments based on lighting, exposure, or other conditions.

37 Claims, 9 Drawing Sheets

(56) References Cited

U.S. PATENT DOCUMENTS

| | | | |
|---|---|---|---|
| 2006/0198624 A1* | 9/2006 | Ono et al. | 396/133 |
| 2006/0290805 A1* | 12/2006 | Cho et al. | 348/351 |
| 2007/0003267 A1* | 1/2007 | Shibutani | 396/123 |
| 2007/0009248 A1* | 1/2007 | Subbotin | 396/121 |
| 2007/0127138 A1* | 6/2007 | Nakahara | 359/694 |
| 2007/0147817 A1 | 6/2007 | Li et al. | |
| 2007/0187572 A1* | 8/2007 | Subbotin | 250/201.7 |
| 2007/0253691 A1 | 11/2007 | Hsu | |
| 2008/0012978 A1* | 1/2008 | Wang | 348/345 |
| 2009/0086336 A1 | 4/2009 | Horiguchi et al. | |

OTHER PUBLICATIONS

European Search Report—EP08006443, International Search Authority—European Patent Office—Feb. 18, 2010.
International Search Report and Written Opinion—PCT/US2009/034124, International Searching Authority—European Patent Office, Feb. 18, 2010, Feb. 13, 2009.
Taiwan Search Report—TW098104722—TIPO—Apr. 29, 2012.

* cited by examiner

AUTO-FOCUS CALIBRATION FOR IMAGE CAPTURE DEVICE

TECHNICAL FIELD

The disclosure relates to image capture devices and, more specifically, auto-focus techniques for image capture devices such as cameras.

BACKGROUND

Image capture devices, such as digital video cameras or digital still cameras, are used in different applications and environments. An image capture device should be capable of producing high quality imagery from a variety of distances relative to a target of a scene. A typical image capture device may perform an auto-focus process to select a position of a lens within the image capture device that achieves a sharp focus for an image frame of the scene. Without proper focus, captured images or video may appear blurry.

An image capture device may perform an active auto-focus process, a passive auto-focus process, or a combination of the two processes. In the case of passive auto-focus, the auto-focus process implemented by an image capture device may calculate a focus value, such as an image sharpness measure, at several sampled lens positions and select the position of the lens for the scene based on the focus values. For example, in the auto-focus process, the image capture device may select the lens position that yields the best focus value. The lens positions evaluated by the auto-focus process may reside within a specified search range.

Moving the lens to multiple lens positions within the search range can result in auto-focus latency and undesirable power consumption. In addition, manufacturing characteristics of lens modules may vary, resulting in differences in auto-focus performance.

SUMMARY

In general, the disclosure relates to techniques for calibration of an auto-focus process in an image capture device. The image capture device may include a digital still camera, a digital video camera, or other devices. The techniques may involve calibration of a lens actuator used to move a lens within a search range during an auto-focus process. For example, an image capture device may adjust reference positions for the search range based on lens positions selected for different focus conditions.

The different focus conditions may include a far focus condition and a near focus condition. The focus conditions may be determined based on a detected environment in which the image capture device is used. As an example, detection of an indoor environment may indicate a likelihood of near object focus, while detection of an outdoor environment may indicate a likelihood of far object focus. An image capture device may detect indoor and outdoor environments based on color characteristics, illuminant characteristics, or other characteristics.

In one aspect, the disclosure provides a method comprising detecting a focus condition of an image capture device, moving a lens of the image capture device among multiple lens positions, selecting one of the lens positions based on a focus value for the selected position, and adjusting an auto-focus lens position search range based on the selected lens position when the focus condition is detected.

In another aspect, the disclosure provides a device comprising a focus condition module that detects a focus condition of an image capture device, a lens actuation module that moves a lens of the image capture device among multiple lens positions, and a focus control module that selects one of the lens positions based on a focus value for the selected position, and adjusts an auto-focus lens position search range based on the selected lens position when the focus condition is detected.

In an additional aspect, the disclosure provides a computer-readable medium comprising instructions to cause one or more processors to detect a focus condition of an image capture device, control movement of a lens of the image capture device among multiple lens positions, select one of the lens positions based on a focus value for the selected position, and adjust an auto-focus lens position search range based on the selected lens position when the focus condition is detected.

The details of one or more aspects of the disclosure are set forth in the accompanying drawings and the description below. Other features, objects, and advantages will be apparent from the description and drawings, and from the claims.

DETAILED DESCRIPTION

Figure 1:
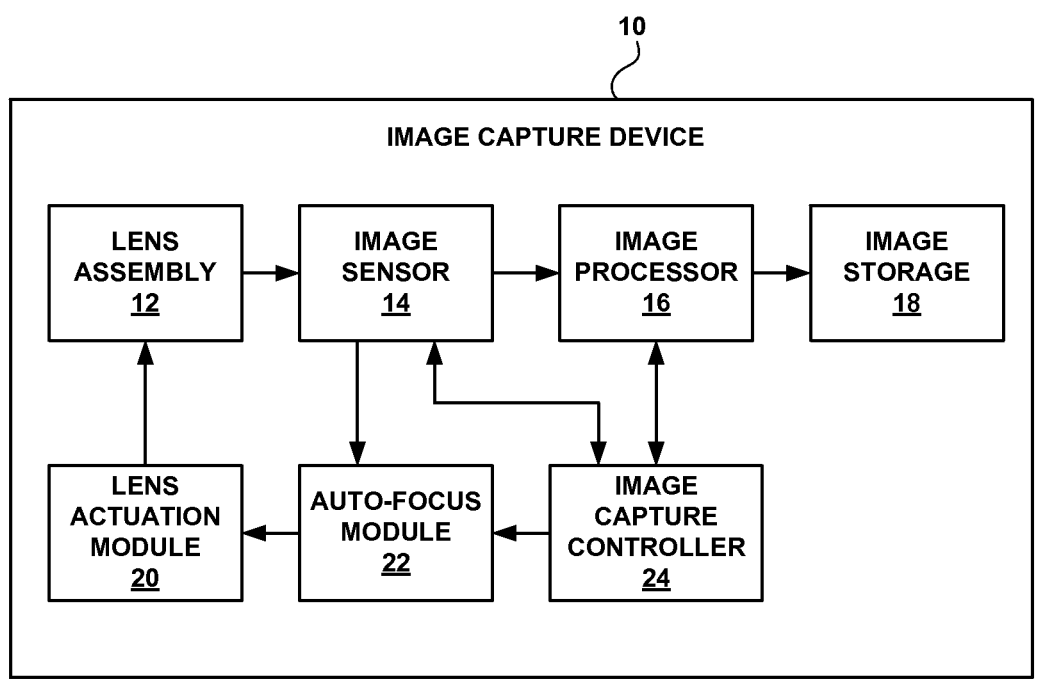
FIG. 1 is a block diagram illustrating an example of an image capture device incorporating an auto-focus calibration feature.

This disclosure relates to techniques for calibration of an auto-focus process in an image capture device. An image capture device includes an image sensor that senses an image via a lens. An auto-focus process generally involves moving the lens among different candidate lens positions within a search range, calculating focus values at each of the positions, and selecting one of the positions as an optimal position to capture an image based on the focus values. The focus value may be determined based on a degree of focus, such as an image sharpness measure, for a given frame to be captured. The sharpness measure may be determined, for example, based on contrast characteristics of pixel values generated by a sensor associated with the image capture device. To reduce auto-focus latency, the image capture device may apply a search algorithm to more efficiently select a relatively small number of candidate positions within the search range.

A lens module typically includes at least one lens and an actuator to move the lens to several different positions within the search range. In some cases, the actuator may include one or more voice coil actuators, stepper motors, piezoelectric actuators, or other types of actuators, which move the lens among different lens positions within the search range, i.e., to two or more different lens positions. Although the sharpness measure and search algorithm may be effective, the lens module may introduce error into the auto-focus process. For example, the precise relationship between actuator drive value and actual lens position may not be known. However, factory calibration of every lens module may increase manufacturing time and cost. An auto-focus calibration technique, as described in various aspects of this disclosure, may be effective in compensating for variation among lens modules. Hence, an auto-focus calibration technique may eliminate the need to calibrate lens modules at the time of manufacture, thereby reducing manufacturing time and costs.

In some aspects, an auto-focus calibration technique may support auto-focus module calibration without the need for module-by-module calibration during the manufacturing process. In addition, the auto-focus calibration technique, in some aspects, may achieve auto-focus module calibration without the need for user intervention. The auto-focus calibration device may be implemented within an image capture device to support self-calibration during normal use of the image capture device. For example, in some aspects, the auto-focus calibration technique may be performed in the background while the user operates the image capture device to obtain video or still images. The more the image capture device is used, the better the self-calibration may be. Self-calibration, in some aspects, may increase lens module yield, e.g., by allowing larger variation among lens modules used in image capture devices. In addition, in some aspects, self-calibration may enhance the performance of the auto-focus process e.g., in terms of reduced latency and increased accuracy.

In general, an auto-focus calibration technique may involve calibration of a lens actuator used to move a lens within a search range during an auto-focus process. For example, an image capture device may adjust reference positions, such as near focus and far focus bounds, for the search range based on lens positions selected for different focus conditions. The process may specify drive values that correspond to the near and far focus bounds. The different focus conditions may include a far focus condition and a near focus condition. The focus conditions may be determined based on a detected environment in which the image capture device is used. As an example, detection of an indoor environment may indicate a likelihood of near object focus, while detection of an outdoor environment may indicate a likelihood of far object focus. As will be described, an image capture device may detect indoor and outdoor environments based on color characteristics, illuminant condition characteristics, luminance characteristics, and/or other characteristics.

FIG. 1 is a block diagram illustrating an exemplary image capture device 10 for capturing imagery, such as still images or video. Image capture device 10 may implement an auto-focus calibration technique as described in various aspects of this disclosure. In the example of FIG. 1, image capture device 10 includes a lens assembly 12, an image sensor 14, an image processor 16, an image storage device 18, a lens actuation module 20, an auto-focus module 22 and an image capture controller 24. Lens assembly 12 may include one or more lenses. Lens actuation module 20 may include one or more actuators, such as one or more voice coil motors, stepper motors, piezoelectric actuators, or the like. In operation, lens actuation module 20 may move the lens in lens assembly 12 among a plurality of different lens positions to focus the lens. In other words, lens actuation module 20 may move the lens to multiple lens positions. Lens assembly 12 and lens actuation module 20 may together form a lens module.

The components included in image capture device 10 illustrated in FIG. 1 may be realized by any suitable combination of hardware and/or software. In the illustrated aspect, the components are depicted as separate units or modules. However, in other aspects, various components described with reference to FIG. 1 may be integrated into combined units within common hardware and/or software. Accordingly, the representation of features as components or modules is intended to highlight particular functional features, and does not necessarily require realization of such features by separate hardware or software.

Image capture device 10 may include a digital camera, such as a digital video camera, a digital still camera, or a combination of both. Image capture device 10 may form part of another device that incorporates a still or video camera, such as a wireless communication device handset, a mobile gaming device, a mobile computing device, or the like. In some aspects, image capture device 10 also may include a microphone to capture audio, which may correlate with images or video obtained by the image capture device. In the case of a wireless communication device handset, such as a mobile radiotelephone often referred to as a cell phone, image capture device 10 may form part of a so-called camera phone or video phone. Image capture device 10 may be equipped to capture color imagery, black-and-white imagery, or both. In this disclosure, the terms "image," "imagery," "image information," or similar terms may interchangeably refer to either video or still pictures. Likewise, the term "frame" may refer to either a video frame or a still picture frame obtained by image capture device 10.

Image sensor 14 obtains image information for a scene. The image information may be processed by image processor 16 and stored in image storage device 18 to capture an image frame of the scene. Also, image sensor 14 may obtain image information for the scene prior to capturing an image frame of the scene, e.g., for use in auto-focus calibration as described in this disclosure, or use in other processes such as automatic white balance (AWB) or automated exposure (AE) processes. Image sensor 14 may include a two-dimensional array of individual image sensor elements, e.g., arranged in rows and columns. Image sensor 14 may comprise, for example, an array of solid state sensor elements such as complementary metal-oxide semiconductor (CMOS) sensor elements or charge-coupled device (CCD) sensor elements.

The image sensor elements within sensor 14 are exposed to the scene to obtain image information for the scene. For example, image sensor 14 may include an array of CMOS sensor elements with a rolling shutter that sequentially exposes the sensor elements within the array to a scene. Hence, the sensor elements in sensor 14 may not instantaneously capture all of the image information of a frame. Instead, the sensor elements may be sequentially exposed to the scene to obtain the image information of the frame. Image capture device 10 may set an integration time for sensor 14, limiting the amount of time to which sensor 14 is exposed to light to obtain image information of a given frame.

Image sensor 14 provides the image information of one or more frames to image processor 16 for storage in image storage device 18. Image sensor 14 also may provide the image information to image capture controller 24. Image capture controller 24 may utilize the image information for preliminary visual front end (VFE) processing, such as automatic focus (AF), automatic exposure (AE) and automatic white balance (AWB) processes. For example, image capture controller 24 may control auto-focus module 22 to initiate an auto-focus process based on the image information from sensor 14. The auto-focus process within image capture device 10 may involve calculating focus values at several sampled lens positions within a search range and selecting the position of the lens for the scene based on the focus values. The selected lens position may be associated with the maximum focus value for the scene, which may correspond to a maximum image sharpness value. For example, the focus value may include a sharpness value of an image produced by image sensor 14 when the lens is at the selected position. Auto-focus module 22 may determine image sharpness based on analysis of pixel contrast values within the image information obtained by image sensor 14.

To support the auto-focus process, auto-focus module 22 may control lens actuation module 20 to move one or more lenses within lens assembly 12 to multiple lens positions within an auto-focus lens position search range. Image sensor 14 may generate image information for each lens position. Auto-focus module 22 may generate a focus value for the image information obtained at each lens position, and select one of the lens positions based on the focus value. For example, auto-focus module 22 may select the lens position that produces the highest focus value, as described above. Upon selection of the lens position, image capture controller 24 may direct image sensor 14 to obtain the image information with lens assembly 12 at the selected lens position.

Upon determining a maximum focus value for the scene, auto-focus module 22 may select the lens position associated with the maximum focus value for the scene. Image capture controller 24 then may set the selected lens position for the scene and control sensor 14 to capture an image frame of the scene using the selected lens position to achieve a sharp focus for the image frame of the scene. Image processor 16 may receive the captured image frame from sensor 14 and perform any necessary processing on the image frame. Image processor 16 may, for example, perform filtering, cropping, demosaicing, compression, image enhancement, color correction, or other processing of the image frame captured by sensor 14. Image processor 16 may comprise multiple units, or possibly a pipeline of processing units to perform the desired processing steps.

Image processor 16 may store the image frame in image storage device 18. Image processor 16 may store raw image frames, processed image frames, or encoded image frames in image storage device 20. If the imagery is accompanied by audio information, the audio also may be stored in image storage device 20, either independently or in conjunction with the image frames. Image storage device 18 may comprise any volatile or non-volatile memory or storage device, such as read-only memory (ROM), electrically erasable programmable read-only memory (EEPROM), or FLASH memory, or such as a magnetic data storage device or optical data storage device.

Image processor 16, image capture controller 24, auto-focus module 22 and other components of FIG. 1 may be realized, at least in part, by any of a variety of integrated circuit devices, such as one or more microprocessors, digital signal processors (DSPs), application specification integrated circuit (ASICs), field programmable gate arrays (FPGAs), or any other equivalent discrete or integrated logic circuitry. In some aspects, image processor 16 may form part of an encoder-decoder (CODEC) that encodes the image frame according to a particular encoding technique or format, such as MPEG-2, MPEG-4, ITU H.263, ITU H.264, JPEG, or the like. Auto-focus module 22 may be implemented as an independent hardware component or as a programmable feature of a logic device, such as a microprocessor, DSP or the like. In some aspects, auto-focus module 22 may be a programmable or integrated feature of a logic device implementing image processor 16. For example, auto-focus module 22 may be implemented as one or more software processes executed by such a logic device.

In operation, for auto-focus calibration, auto-focus module 22 may generate a control signal, e.g., in the form of a digital drive value, to direct lens actuation module 20 to move a lens within lens assembly 12 among multiple lens positions. Auto-focus module 22 may determine a focus condition of image capture device 10. In some aspects, auto-focus module 22 may select the multiple lens positions based at least in part on the focus condition. Auto-focus module 22 may determine focus values for each of the lens positions based on analysis of image information obtained by image sensor 14 at the lens positions. Based on the focus values, auto-focus module 22 may select one of the lens positions, e.g., a lens position producing the highest focus value. Auto-focus module 22 may adjust an auto-focus lens position search range based on the selected lens position when the focus condition is detected. The adjusted auto-focus lens position search range then may be used by auto-focus module 22 to select candidate lens positions for the normal auto-focus process.

In some aspects, auto-focus module 22 may detect either a first focus condition or a second focus condition of image capture device 10. The second focus condition is different from the first focus condition. Auto-focus module 22 may adjust the auto-focus lens position search range based on the selected lens position when the first focus condition is detected, and also adjust the auto-focus lens position search range based on the selected lens position when the second focus condition is detected. For example, the search range may include a near focus bound and a far focus bound. The near focus bound may correspond to an approximation of the minimum optical focus ("optical near") position of the lens in lens assembly 12, relative to the surface of image sensor 14. The far focus bound may correspond to an approximation of the maximum optical focus ("optical far" or "infinity") position of lens assembly 12, relative to the surface of image sensor 14.

The optical near position may correspond to a close optical focus position, e.g., for focusing on close objects in a so-called macro mode of image capture device 10. For example, a macro mode may permit focusing on objects less than 10 centimeters away from the lens. The optical far position may correspond to an infinity focus position at which the lens theoretically focuses on an object at an infinite distance from image capture device 10. At distances greater than the optical far position, i.e., there is generally no further effect on the infinity focusing capability of image capture device 10. At distances less than the optical near position, the macro focusing capability of image capture device 10 may be enhanced to focus on objects at distances of less than 10 cm.

An auto-focus process performed by auto-focus module 22 may operate within the search range defined by the near focus and far focus bounds. In particular, in normal operation, auto-focus module 22 may control lens actuation module 20 to cause the lens in lens assembly 12 to move to different positions within the auto-focus search range that extends between the lens positions corresponding to the near and far focus bounds. Auto-focus module 12 may then select the lens position that produces the best focus value to capture the image. For calibration of the search range, however, the auto-focus calibration process performed by auto-focus module 22 may explore lens positions both within and outside the search range in order to adjust the near focus and far focus bounds.

Consequently, auto-focus module 22 may enlarge or reduce the search range based on the auto-focus calibration process. Auto-focus module 22 may adjust the near focus bound of the search range when the near focus condition is detected, and adjust the far focus bound of the search range when the far focus condition is detected. In this manner, auto-focus module 22 can calibrate the auto-focus lens position search range to the actual characteristics of lens assembly 12 and lens actuation module 20.

Lens assembly 12 includes a maximum mechanical stop and a minimum mechanical stop. The maximum and minimum mechanical stops limit the travel of the lens along the focus path. The minimum mechanical stop may correspond to a near focus of image capture device 10 while the maximum mechanical stop may correspond to a far focus. Ideally, the minimum and maximum mechanical stops would correspond to the optical near and far focus positions, respectively. As a result of manufacturing imprecision of lens assembly 12 and/or lens actuation module 20, however, the actual optical near and far focus positions are normally different from the mechanical stops.

For example, the maximum optical far focus position is generally unknown and somewhat less than the maximum mechanical stop distance of lens assembly 12, with distance and position being measured relative to the near mechanical stop. Similarly, the optical near focus positions is generally unknown and somewhat greater than the minimum mechanical stop distance of lens assembly 12. An auto-focus calibration technique, in accordance with various aspects of this disclosure, may permit the actual optical near and far focus positions to be determined or approximated so that the near and far bounds of the search range can be adjusted for better auto-focus performance, e.g., in terms of search latency, power consumption and/or accuracy. In this manner, image capture device 10 may self-calibrate the lens module comprising lens assembly 12 and lens actuation module 20.

The first focus condition may be a focus condition associated with an indoor environment. An indoor environment may indicate a greater likelihood that image capture device 10 is being used to capture an image of a near focus object. A near focus condition may be useful in adjusting a near focus bound of the auto-focus lens position search range. The second focus condition may be a focus condition associated with an outdoor environment. An outdoor environment may indicate a greater likelihood that image capture device 10 is being used to capture an image of a far focus object. A far focus condition may be useful in adjusting a far focus bound of the auto-focus lens position search range.

Auto-focus module 22 may detect a focus condition in any of a variety of ways. As examples, auto white balance (AWB) data, automatic exposure (AE) data or both may indicate indoor color and/or lighting or, alternatively, outdoor color and/or lighting. For example, AWB and AE values or settings may indicate the environmental color, illumination, and luminance characteristics. Hence, detection of the focus condition may be based on at least one of white balance and/or exposure conditions of image capture device 10. Also, in some embodiments, auto-focus module 22 may utilize pattern or object recognition techniques to identify objects typically associated with an outdoor environment. In this case, detection of the focus condition may be based on recognition of one or more objects in an image produced by image sensor 14. For example, recognition of a tree, building, landscape or other outside object may indicate an outdoor focus condition. Object or pattern recognition may be used either alone or in combination with other indicia such as AWB and/or AE data to detect a focus condition.

Upon detecting an indoor focus condition, auto-focus module 22 may initiate an auto-focus search for a near focus lens position. For example, auto-focus module 22 may search for the near focus lens position by moving the lens to multiple positions within a calibration sub-range of the near-focus bound of an existing auto-focus lens position search range. Upon selecting the near focus lens position, e.g., based on focus value, auto-focus module 22 may adjust the existing lens position search range by adjusting the near-focus bound based on the selected near focus lens position. In some aspects, auto-focus module 22 may simply set the near focus bound of the search range to the value of the selected lens position. In other aspects, auto-focus module 22 may calculate the near focus bound of the search range as a mathematical function or precomputed lookup function of the selected lens position.

In a similar manner, upon detecting an outdoor focus condition, auto-focus module 22 may initiate an auto-focus search for a far focus lens position. Auto-focus module 22 may search for the far focus lens position by moving the lens to multiple positions within a calibration sub-range associated with the optical far-focus bound of the existing auto-focus lens position search range. Upon selecting the far focus lens position, e.g., based on focus value, auto-focus module 22 may adjust the existing lens position search range by adjusting the far-focus bound based on the selected far focus lens position. In some aspects, auto-focus module 22 may simply set the far focus bound of the search range to the value of the selected lens position. In other aspects, auto-focus module 22 may calculate the far focus bound of the search range as a function of the selected lens position.

In some cases, auto-focus module 22 may maintain statistics indicating the number of times each lens position has been selected as the near-focus lens position in the course of the calibration process, and adjust the near focus bound based on the statistics. Similarly, as in the case of the near-focus lens position, auto-focus module 22 may maintain statistics indicating the number of times each lens position has been selected as the far-focus lens position, and adjust the far focus bound based on the statistics. Hence, auto-focus module 22 may determine a number of times the selected lens position has previously been selected, and adjust the auto-focus lens position search range based on the number of times the selected lens position has previously been selected.

The auto-focus calibration process may be entirely or substantially unsupervised by the user. Therefore, it is desirable to make the calibration process substantially failure proof. When the collected statistics data are used to recalibrate the bounds of the search range, for example, it is desirable that the recalibrated bounds not deviate further away from actual optical bounds. For this reason, in some aspects, it may be better to provide conservative, partial adjustments of the search range, rather than aggressive compensation. Hence, use of statistical data to finely adjust the bounds of the search range may be less risky than resetting the bounds to newly selected lens positions.

The calibration sub-range used in the auto-focus calibration process may include positions within the existing auto-focus search range and positions outside the search range. For the near-focus position, for example, auto-focus module 22 may control lens actuation module 20 to move the lens in lens assembly 12 to positions greater than the near-focus bound and positions less than the near-focus bound, relative to the surface of image sensor 14. For the far-focus position, auto-focus module 22 may control lens actuation module 20 to move the lens in lens assembly 12 to positions greater than the far-focus bound and positions less than the far-focus bound. Hence, some of the lens positions evaluated for purposes of auto-focus calibration may reside outside of the existing auto-focus search range. For example, auto-focus module 22 may control lens actuation module 20 to move the lens among multiple lens positions between the near focus mechanical stop of the lens and the far focus bound when the near focus condition is detected, and between the near focus bound and the far focus mechanical stop when the far focus condition is detected.

In some aspects, based on the auto-focus calibration, auto-focus module 22 may enlarge the auto-focus search range to include additional lens positions that support better focus values, or reduce the auto-focus search range to exclude lens positions that do not support better focus values. For example, auto-focus module 22 may update the near focus and far focus bounds of the search range based on the actual optical characteristics of lens assembly 12 when the lens is at different positions. In particular, adjusting the auto-focus lens position search range based on the selected lens position may comprise reducing the auto-focus lens position search range when the selected lens position is greater than the near focus bound and less than the far-focus bound, and increasing the auto-focus lens position search range when the selected lens position is greater than the far focus bound or less than the near focus bound.

Reducing the size of the auto-focus search range may reduce search latency in the normal auto-focus process and conserve power. Enlarging the size of the auto-focus search range may increase the likelihood of identifying a desirable and possibly optimal lens position for a given image so that better auto-focus accuracy can be obtained. For example, enlarging the search range may permit accurate focusing on objects that could not be accurately focused at lens positions within the original search range. Hence, by analyzing behavior of lens assembly 12 and lens actuation module 20, an efficient auto-focus algorithm can be implemented to enhance accuracy, latency, consistency and power consumption. With auto-focus self-calibration, image capture device 10 can be used with lens and actuators having a wider range of physical characteristics, possibly resulting in lower cost of manufacture. Also, when actuator variation exists, auto-focus performance may gradually improve over time as the auto-focus calibration process compensates for the variation.

When the near focus condition is detected, and the selected lens position is greater than the near focus bound, auto-focus module 22 may reduce the auto-focus lens position search range. For example, auto-focus module 22 may increase the near focus bound to a position further away from image sensor 14 when the near focus condition is detected and the lens position selected in the auto-focus calibration process is greater than the existing near focus bound. When the selected lens position is less than the existing near focus bound and the near-focus condition is detected, auto-focus module 22 may enlarge the auto-focus lens position search range. For example, auto-focus module 22 may reduce the near focus bound to a position closer to image sensor 14 when the lens position selected in the auto-focus calibration process is less than the near focus bound and the near-focus condition is detected.

Likewise, when the far-focus condition is detected, and the selected lens position is greater than the far focus bound, auto-focus module 22 may enlarge the auto-focus lens position search range. For example, auto-focus module 22 may increase the far focus bound to a position further away from image sensor 14 when the far focus condition is detected and the lens position selected in the auto-focus calibration process is greater than the existing far focus bound. When the selected lens position is less than the existing far focus bound and the far-focus condition is detected, auto-focus module 22 may reduce the auto-focus lens position search range. For example, auto-focus module 22 may reduce the far focus bound to a position closer to image sensor 14 when the lens position selected in the auto-focus calibration process is less than the far focus bound and the far-focus condition is detected.

Figure 2:
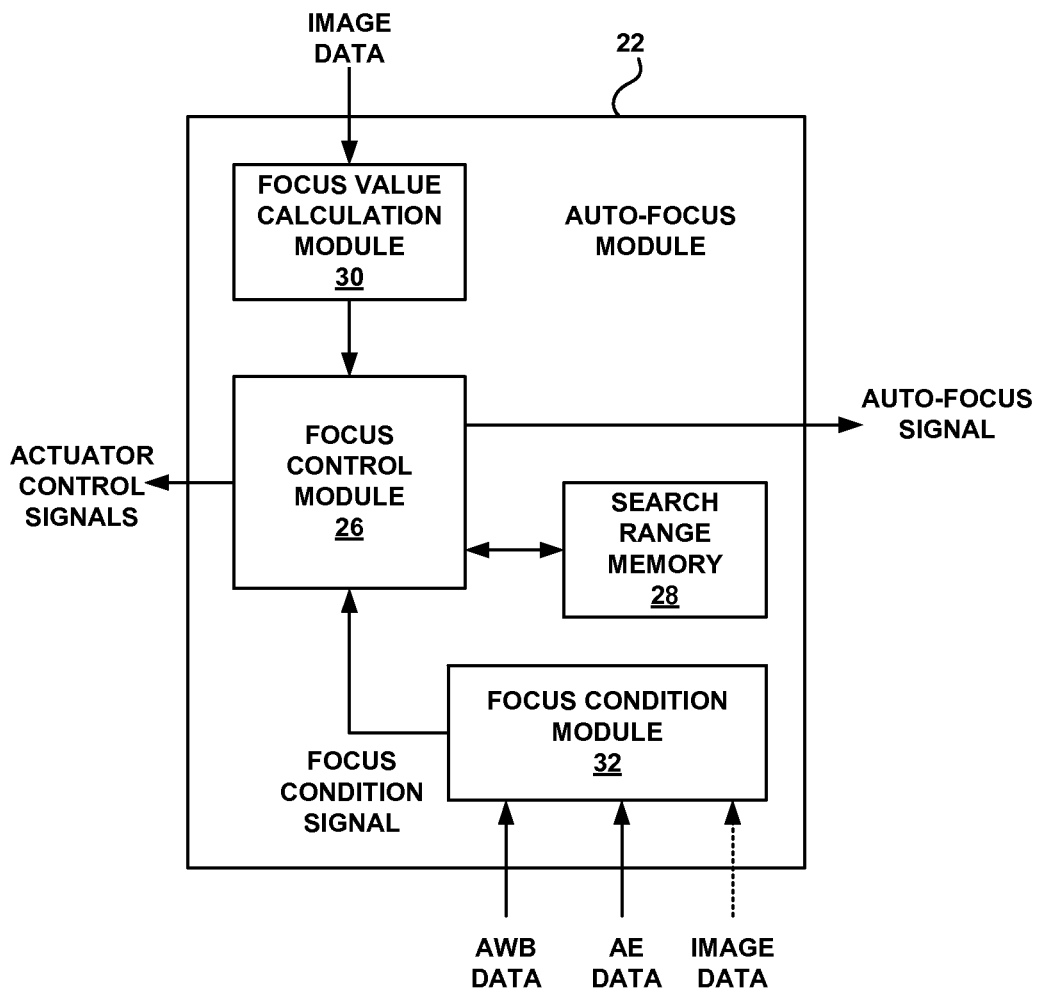
FIG. 2 is a block diagram illustrating an example of an auto-focus module for use in the image capture device of FIG. 1.

FIG. 2 is a block diagram illustrating an example of auto-focus module 22 for use in the image capture device 10 of FIG. 1. In the example of FIG. 2, auto-focus module 22 includes focus control module 26, search range memory 28, focus value calculation module 30 and focus condition module 32. Auto-focus module 22 may be configured to perform both a normal auto-focus process and an auto-focus calibration process. Search range memory 28 may store a range of actuator drive values that correspond to positions within an auto-focus lens position search range. The search range may be defined by a first drive value that corresponds to the far focus bound and by a second drive value that corresponds to the near focus bound. Depending on the home position of the lens within the lens assembly 12, the first drive value may be a maximum or minimum drive value. In other words, smaller drive values may correspond to lens positions closer to the near focus position and larger drive values may correspond to lens positions closer to the far focus position, or vice versa.

Using the drive values stored in search range memory 28, focus control module 26 generates actuator control signals that drive lens actuation module 20 to move the lens in lens assembly 12 to desired positions within the search range. During the auto-focus process, focus control module 26 may select drive values corresponding to positions within the search range. For the auto-focus process, focus control module 26 may select the drive values according to any of a variety of existing auto-focus search algorithms. Focus value calculation module 30 receives image data from image sensor 14 with the lens at each position, and generates a focus value for the image data. The focus value may be calculated based on a sharpness characteristic of pixel intensity information associated with the image data, and may rely on any of a variety of existing calculation techniques.

Focus control module 26 receives focus values from focus value calculation module 30 for each of the lens positions, and may select one of the lens positions based on the focus values. For example, focus control module 26 may select the lens position producing the maximum focus value, and maintain the selected lens position for capture of the subject image by image sensor 14. In particular, focus control module 26 may provide an auto-focus signal to image capture controller 24. In response, image capture controller 24 may control images sensor 14 and image processor 26 to capture the image using the lens position presently selected by focus control module 26 according to the auto-focus process.

The drive values or other information stored in search range memory 28 define the search range used in the auto-focus process. In accordance with various aspects of this disclosure, focus control module 26 may adjust the drive values or other information in search range memory 28 to calibrate the auto-focus process. Like the auto-focus process, the auto-focus calibration process performed by auto-focus module 22 may involve evaluation of the focus values produced at different lens positions. However, focus control module 26 may trigger the auto-focus calibration process when a particular focus condition is detected. For example, focus condition module 32 may detect a focus condition and provide a focus condition signal to focus control module 26.

Focus condition module 32 may detect a focus condition based on one or more characteristics indicating a particular usage environment in which image capture device 10 is being used. For example, focus condition module 32 may infer a focus condition from a particular usage environment, such as an indoor or outdoor environment. Focus condition module 32 may detect a particular usage environment based on one or more characteristics, such as illuminant condition and/or luminance data, which may be provided by AWB data or AE data. Alternatively, or additionally, focus condition module 32 may be configured to analyze image data obtained from image sensor 14 to identify a pattern or object indicative of a particular usage environment. In response to the focus condition signal from focus condition module 32, focus control module 26 may detect whether a near focus or far focus condition exists. If so, focus control module 26 may activate the auto-focus calibration process to update the search range data in search range memory 28. If not, focus control module 26 continues to execute the normal auto-focus process without calibration using existing search range data from search range memory 28.

Figure 3:
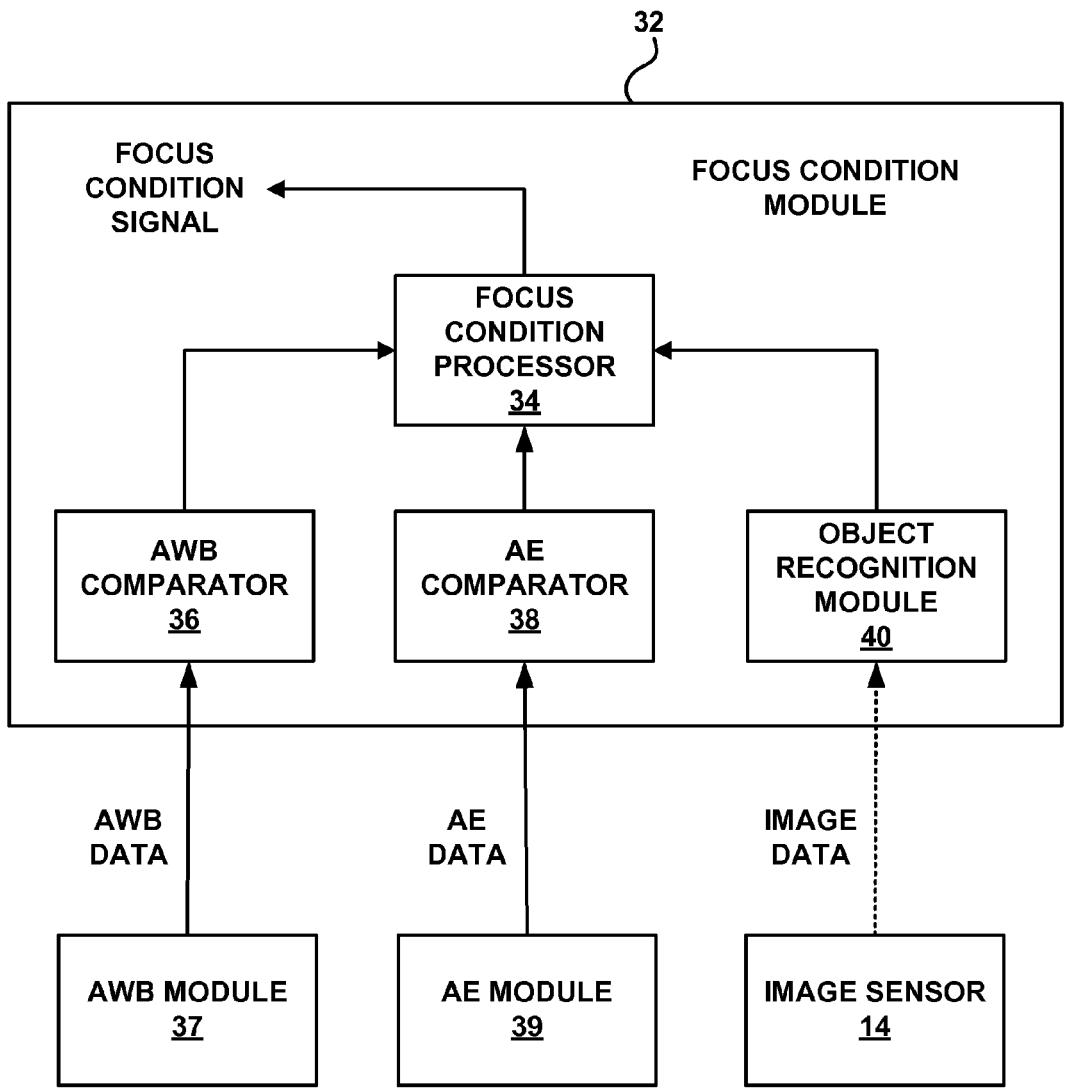
FIG. 3 is a block diagram illustrating an example of a focus condition module for use in the auto-focus module of FIG. 2.

FIG. 3 is a block diagram illustrating an example of a focus condition module for use in the auto-focus module 32 of FIG. 2. As shown in FIG. 3, in some aspects, focus condition module 32 may include a focus condition processor 34, AWB comparator 36 and AE comparator 38. Also, in some aspects, focus condition module 32 may optionally include an object recognition module 40, either alone or in combination with AWB comparator 36 and AE comparator 38. AWB comparator 36, AE comparator 38 and object recognition module 40 may generate outputs indicating whether the respective comparison or analysis corresponds to a particular focus condition. Focus condition processor 34 may detect a focus condition based on at least one of illuminant condition data and luminance data, which may be obtained from white balance data and exposure data of the image capture device 10. For example, focus condition processor 34 may analyze data from AWB comparator 36, AE comparator 38 and/or object recognition module 40 to determine whether a far focus or near focus condition exists.

AWB comparator 36 may compare AWB data to reference AWB values. The AWB data may include an illuminant condition value for a scene captured by device 10. AWB illuminant values or other AWB data may be used to control the white balance of a captured image. The AWB data may provide an indication of illuminant color characteristics and/or illuminant intensity characteristics. For example, the AWB data may indicate an illuminant condition, such as any of a variety of Commission Internationale de L'Eclairage (CIE) illuminant conditions detected for a scene. The illuminant conditions may indicate spectral power distributions for different types of white light sources. The AWB module 37 may obtain the characteristics, for example, by analyzing raw or processed image data obtained from image sensor 14, or from one or more color and/or illuminant sensors. Focus condition module 32 may obtain the AWB data from an AWB module 37 of image capture device 10. AWB module 37 may be hardware-based and/or software-based, and may be configured to adjust white balance based on illuminant characteristics for a scene.

As an illustration, if the AWB data indicate illuminant color characteristics and/or illuminant intensities consistent with an indoor environment, AWB comparator 36 may output an indication of an indoor environment, which may correspond to a near focus condition. For example, AWB comparator 36 may compare the AWB data to any of a variety of thresholds or ranges of AWB data that correspond to an indoor or outdoor environment. If the AWB data indicate illuminant color characteristics and/or illuminant intensities consistent with an outdoor environment, e.g., as an illuminant condition, AWB comparator 36 may output an indication of an outdoor environment, which may correspond to a far focus condition. If the AWB data are inconclusive, AWB comparator 36 may not indicate an indoor or outdoor environment, in which case focus control module 26 may apply the normal auto-focus process without initiating the auto-focus calibration process.

AE comparator 38 may compare AE data to reference AE values. The AE data may include a luminance level of a scene captured by device 10. Focus condition module 32 may obtain the AE data from an AE module 39 of image capture device 10. AE module 39 may be configured to evaluate luminance levels and adjust exposure of image sensor 14, e.g., by adjusting exposure time and/or aperture size. AE module 39 may obtain the luminance levels or other data, for example, by analyzing raw or processed image data obtained from image sensor 14, or from one or more luminance sensors. If the AE data indicate a luminance level consistent with an indoor environment, AE comparator 38 may output an indication of an indoor environment, which may correspond to a near focus condition. In some cases, the luminance level may be expressed in Lux. If the AE data indicate a luminance level consistent with an outdoor environment, AE comparator 38 may output an indication of an outdoor environment, which may correspond to a far focus condition. Lower luminance levels may indicate lower lighting levels associated with an indoor environment. Conversely, higher luminance levels may indicate higher lighting levels associated with an outdoor environment. For example, AE comparator 38 may compare the AE data to any of a variety of thresholds or ranges of AE data that correspond to an indoor or outdoor environment. If the AE values are inconclusive, AE comparator 38 does not indicate an indoor or outdoor environment.

Focus condition processor 36 may rely on the output of one or both of AWB comparator 36 and AE comparator 38 to determine whether the usage environment of image capture device 10 is consistent with a near focus or far focus condition. For example, focus condition processor 36 may generate a focus condition signal that triggers the auto-focus calibration process if one of AWB comparator 36 and AE comparator 38 indicates a near focus or far-focus condition. Alternatively, for higher confidence, focus condition processor 36 may require that both AWB comparator 36 and AE comparator 38 indicate a near focus or far focus condition. If the AWB and AE data do not indicate a far focus or near focus condition, then focus condition module 32 does not generate a focus condition signal. In this case, focus control module 26 performs the normal auto-focus process without initiating the auto-focus calibration process.

As an illustration, if AWB module 37 determines that the scene is under daylight illumination, such as a CIE D65 illuminant condition, and AE module 39 determines that the light is very bright, such as 2000 Lux or greater, it is very likely that the scene is an outdoor scene. In this case, AWB comparator 36 and AE comparator 38 may detect AWB and AE data, respectively, that indicate an outdoor scene. On the other hand, if AWB module 37 determines that the light source is fluorescent or incandescent, and AE module 39 determines that the brightness is dim, such as 200 Lux or lower, it is very likely that the scene is an indoor scene. In this case, AWB comparator 36 and AE comparator 38 may detect AWB and AE data, respectively, that indicate an indoor scene.

AWB comparator 36 and AE comparator 38 may compare AWB data values and AE data values, respectively, to corresponding AWB references value and AE reference values. The AWB data values and AE data values may be actual illuminant condition and luminance values, respectively. As an alternative, the AWB data values and AE data values may be index values that indicate relative illuminant values and luminance values, respectively. Alternatively, AWB module 37 and AE module 39 may generate indications of outdoor or indoor conditions without providing actual data or index values. In these cases, AWB comparator 36 and AE comparator 38 may compare actual data or index values to reference data or reference index values, or simply monitor the output of AWB module 37 and AE module 39 for indication of an indoor or outdoor condition. Accordingly, the implementation shown in FIG. 3 is provided for purposes of example and should not be considered limiting of the techniques described in this disclosure.

If object recognition module 40 is provided, focus condition module 32 obtains image data from image sensor 14. Object recognition module 40 may apply pattern or object recognition techniques to identify objects typically associated with an outdoor environment. Examples of outdoor objects may include buildings, trees, landscapes, and the like. Positive output from object recognition module 40 indicating recognition of an object or pattern consistent with an outdoor environment may serve as an indication of a far focus condition for focus condition processor 34. Focus condition processor 34 may generate a focus condition signal in response to positive output from objection recognition module 40, either alone or in combination with output from AWB comparator 36 and/or AE comparator 38. In some aspects, object recognition module 40 may be configured to detect objects or patterns indicative of an indoor environment. Due to significant variation in patterns and objects among indoor environments, however, object recognition may be more reliable for outdoor environments.

Figure 4:
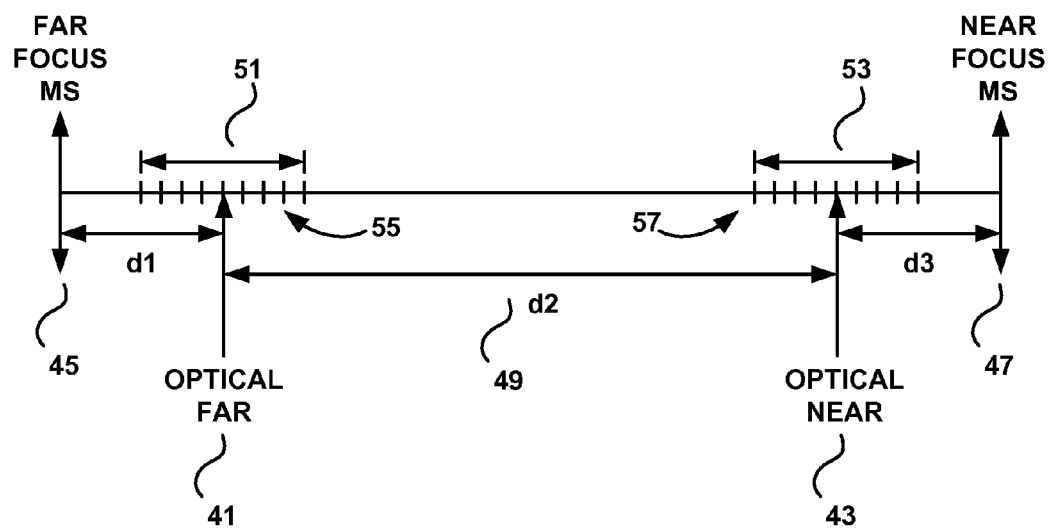
FIG. 4 is a diagram illustrating optical far focus and optical near focus lens positions within an auto-focus search range of a lens assembly.

FIG. 4 is a diagram illustrating optical far focus and optical near focus lens positions within an auto-focus search range of a lens assembly, such as lens assembly 12 of FIG. 1. During an auto-focus process, auto-focus module 22 may control lens actuation module 20 to move the lens in lens assembly 12 among multiple lens positions within a search range. The lens positions within the search range are defined by an optical far focus bound 41 and an optical near focus bound 43. Lens movement is limited by the far focus mechanical stop (MS) 45 and the near focus mechanical stop (MS) 47. The near focus MS 47 defines the closest possible lens position relative to the surface of image sensor 14. The far focus MS 45 defines the furthest possible lens position relative to the surface of image sensor 14.

The optical far focus bound 41 defines the lens position at which the lens theoretically focuses on a point at infinity. The near focus bound 43 may define the lens position at which the lens focuses on an object at a distance of approximately 10 cm from the surface of image sensor 14. At positions greater than optical far focus bound 41, i.e., closer to far focus MS 45, the lens would continue to focus on infinity, assuming the optical far focus bound is correct. In other words, it is not possible to focus on objects at distances beyond infinity. For this reason, optical far focus bound 41, if correct, operates as a practical limit on the lens position because further movement toward far focus MS 45 should not change the focus of the lens nor produce any better sharpness. At positions less than optical near focus bound 43, however, it is possible to focus on objects at progressively closer distances. In this disclosure, the optical near focus bound 43 is selected assuming a desired macro mode focus of 10 cm. However, other optical near focus bounds at distances of less than 10 cm from near focus MS 47 or the surface of image sensor 14 could be used.

During the auto-focus process, lens actuation module 20 moves the lens among positions within a lens position search range 49 defined by distance d2. Hence, the lens position search range 49 extends between optical far focus bound 41 and optical near focus bound 43. Distance d1 defines the distance between optical far focus bound 41 and far focus MS 45. Distance d3 defines the distance between optical near focus bound 43 and near focus MS 47. Auto-focus module 22 may select particular lens positions within the search range 49 according to any of a variety of auto-focus search algorithms. The different positions within lens position search range may be pre-established in defined increments.

Due to imprecision in the manufacture of lens assembly 14, actuation module 20 or other components, focus bounds 41, 43 of search range 49 may be inaccurate. As a result, the auto-focus process may produce sub-optimal results in terms of latency, power consumption and focus quality. In accordance with various aspects of this disclosure, auto-focus module 22 may perform the auto-focus calibration process in order to adjust the optical far focus bound 41, optical near focus bond 43, or both. In this manner, search range 49 can be calibrated according to the actual characteristics of lens assembly 12 and lens actuation module 20.

With further reference to FIGS. 3 and 4, when focus condition module 32 detects a particular focus condition, such as a likely far focus condition indicated by an outdoor environment or a likely near focus condition indicated by an indoor environment, the focus condition module may generate a focus condition signal to trigger initiation of the auto-focus calibration process by focus control module 26. In some aspects, the auto-focus calibration may be triggered and proceed without user intervention. In effect, in detecting a far focus or near focus condition, focus condition module 32 detects an opportunity for recalibration of the optical far focus bound 41 or the optical near focus bound 43 to improve the accuracy of search range 49.

The far focus condition indicates that the image capture device 10 is likely being used to capture an image of an object at a substantial distance away from the image capture device. In this case, image capture device 10 is likely to rely on a lens position that corresponds to optical far focus bound 41. The lens position that produces the best focus value in the far focus condition can then be used to reset optical far focus bound 41. Conversely, the near focus condition indicates that image capture device 10 is likely being used to capture an object at a closer distance away from the image capture device. In this case, image capture device 10 is more likely to rely on a lens position that corresponds to optical near focus bound 43. The lens position that produces the best focus value in the near focus condition can then be used to reset optical near focus bound 43.

In response to the focus condition signal, focus control module 26 may control lens actuation module 20 to explore various lens positions for calibration purposes. If the focus condition signal indicates a far focus condition, for example, focus control module 26 may control lens actuation module 20 to move the lens to various lens positions within a far focus calibration sub-range 51. If the focus condition signal indicates a near focus condition, focus control module 26 may control lens actuation module 20 to move the lens to various lens positions within a near focus calibration sub-range 53. In the example of FIG. 4, the lens positions in the far focus calibration sub-range 51 and near focus calibration sub-range 53 are generally indicated by reference numerals 55 and 57, respectively.

The far focus calibration sub-range 51 may include lens positions 55 somewhat greater than the existing optical far focus position 41 and somewhat less than the existing optical far focus position. Similarly, the near focus calibration sub-range 53 may include lens positions 57 somewhat greater than the existing optical near focus position 43 and somewhat less than the existing optical near focus position. For example, for a given focus condition, focus control module 26 may explore lens positions within a predetermined margin on either side of the applicable optical focus bound. The number of lens positions evaluated within a calibration sub-range may be subject to variation and design considerations. As an example, the number of lens positions evaluated within a calibration sub-range may be in a range of three to nine lens positions. In the example of FIG. 4, the number of calibration sub-range lens positions indicated by reference numerals 55 and 57 is nine. In some cases, the number of evaluated lens positions may vary depending on whether a smaller or larger number of lens positions are needed to identify a desired focus value. Also, the number of lens positions may vary according to the type or characteristics of the lens. In general, the terms "greater" and "less than," as used in this disclosure, may refer to lens positions that are further or closer, respectively, to near focus MS 47.

The predetermined margin may be set to any of a variety of values, such as plus and minus five percent, ten percent, or the like for purposes of example. In addition, the predetermined margin may be substantially centered at the applicable optical focus bound, such that focus control module 26 explores an equal number of lens positions at equal distance on either side of the applicable optical focus bound 41, 43. Alternatively, the predetermined margin may be offset such that focus control module 26 explores more lens positions, or lens positions at greater distances from the applicable optical focus bound 41, 43, on one side of the optical focus found versus the other side.

The order, pattern or spacing of lens positions within the calibration sub-range, as the order or other manner in which they are evaluated, may be subject to wide variation. As one example, focus control module 26 may start within the calibration sub-range at a lens position that is closest to near focus MS 47 and proceed to evaluate lens positions in order from closest to the near focus MS to furthest away from the near focus MS. Alternatively, focus control module 26 may start within the calibration sub-range at a lens position that is closest to far focus MS 47 and proceed to evaluate lens positions in order from furthest away from the near focus MS to closest to the near focus MS.

As a further alternative, focus control module 26 may start from the center of the calibration sub-range and evaluate lens positions on either side of the existing optical focus bound (near or far, as applicable) on an alternating basis, starting closest to the optical focus bound and extending outward further away from the optical focus bound. In this case, focus control module 26 may be configured to terminate the evaluation of lens positions early if the focus values of the lens positions further away from the optical focus bound drop below a threshold value, indicating the likelihood that evaluation of additional lens positions will produce sub-optimal focus value results.

For a given focus condition, focus control module 26 may move the lens to different positions within the predetermined margin of the applicable optical focus bound 41, 43, and obtain focus values for the lens positions from focus value calculation module 30, e.g., based on the sharpness values of image data generated by image sensor 14 at the respective lens positions. Focus control module 26 may select the lens position having the best, e.g., highest, focus value, and adjust search range 49 based on the selected lens position. For example, focus control module 26 may automatically reset the applicable optical focus bound 41, 43 to the selected lens position, or adjust the optical focus bound as a function of the selected lens position. Abruptly resetting the optical focus bound to the selected lens position does not take into account statistical data, which may be desirable for a more refined and more conservative adjustment of the optical focus bound of search range 49.

As an illustration, focus control module 26 may update statistics indicating a count of the number of times each lens position has been selected as a near-focus lens position or far-focus lens position. Using the count statistics, focus control module 26 may update the applicable optical focus bound by calculating a weighted average of lens positions selected during the auto-focus calibration process, where the applicable weight for each lens position may be the number of counts for that lens position. Other adjustment techniques and types of statistical data may be used. For example, focus control module 26 may be configured to update the applicable optical focus bound only after multiple occurrences of a particular lens position as the selected lens position. In this manner, by requiring multiple occurrences before adjusting the focus bound, focus control module 26 may reduce the likelihood of reliance on spurious results, and build added confidence in assigning any new focus bound. Accordingly, the various examples provided in this disclosure for focus bound adjustment should be considered exemplary and non-limiting.

As a simple illustration, for the far focus condition, it is assumed that an existing optical far focus bound 41 stored in search range memory 28 is at a lens position of d, (e.g., as a distance from near-focus MS 47), the lens position $d_x$ has been selected five times in previous auto-focus calibration processes, a lens position $d_y$ has been selected three times previously, and a lens position $d_z$ has been selected then times previously. If the optical far focus bound 41 is adjusted based on a weighted average, then the new lens position stored in search memory 28 for the optical far focus bound could be calculated as lens position $d_{far}=(5\ d_x+3\ d_y+10\ d_z)/3$. The resulting bound may be the lens position closest to the lens position value $d_{far}$, e.g., by rounding, if the lens position value $d_{far}$ does not correspond to an exact lens position.

In some cases, however, it may be desirable to have different rules for updating the optical far or near focus bound 41, 43 depending upon the side on which the selected lens position resides relative to the pertinent focus bound. In the case of the optical far focus bound 41, for example, if a selected lens position resides within the existing search range 49 (d2) on a side of the optical far focus bound further away from far focus MS 45, it may be desirable to use a weighted average of lens positions selected for the optical far focus bound in previous iterations of the auto-focus calibration process, e.g., using counts as weights as described above.

For the far focus condition, if the selected lens position resides outside the existing search range (d2) on a side of the optical far focus bound 41 closer to far focus MS 45, however, it may be desirable to abruptly reset the optical far focus bound to the selected lens position to ensure that the selected lens position is considered in the auto-focus process. If only a weighted average were used when the selected lens position was greater the optical far focus bound 41, then the selected lens position would not actually form part of the search range 49, which may be generally undesirable. By resetting the optical far focus bound to the selected lens position when the selected lens position is outside search range 49, focus control module 26 can ensure that the selected lens position forms part of the newly adjusted search range for use in the auto-focus process and subsequent iterations of the auto-focus calibration process.

Similarly, for the near focus condition, it may be desirable to reset optical near focus bound 43 to the selected lens position if the selected lens position is between the existing optical near focus bound and the near focus MS 47, but adjust the optical near focus bound as a function of a weighted average of the newly selected lens position and previously selected lens positions using counts as weights if the selected lens position is within the existing search range 49. In this manner, focus control module 26 may finely adjust optical near focus bound 43 when the selected position is within the existing search range 49, but abruptly reset the optical near focus bound to the selected position if the selected position is outside the search range. Focus control module 26 thereby may ensure that the newly selected focus position forms part of the newly adjusted search range 49 for use in the auto-focus process and subsequent iterations of the auto-focus calibration process. In a sense, this feature may prevent undershooting of the actual optical focus bound, such that the bound can be immediately extended when necessary.

Auto-focus module 22 may trigger the auto-focus calibration process when either of the focus conditions, i.e., near/indoor or far/outdoor, is detected. However, auto-focus module 22 may further require, in addition to detection of a focus condition, that the normal auto-focus process can be successfully applied with a high degree of confidence. If the near or far focus condition is detected, for example, but auto-focus module 22 is unable to produce a reliable focus value in the particular usage environment using the normal auto-focus process, auto-focus module may be configured to not trigger the auto-focus calibration process. In other words, if the normal auto-focus process is not effective in the usage environment, then the auto-focus calibration process should not be initiated in order to avoid collecting data that may be unreliable. Hence, in some aspects, the auto-focus calibration process may be triggered only when an outdoor, far object is detected confidently, or an indoor, near object is detected confidently. Confidence in detection may be determined, as mentioned above, based on production of a reliable focus value for the outdoor or indoor focus environment. Therefore, auto-focus module 22 may consider both the detected focus condition and the focus value produced for the focus condition in determining whether to initiate the auto-focus calibration process. In general, auto-focus module 22 may initiate an auto-focus calibration process when a particular focus condition is detected and the auto-focus process produces a favorable focus value.

Figure 5:
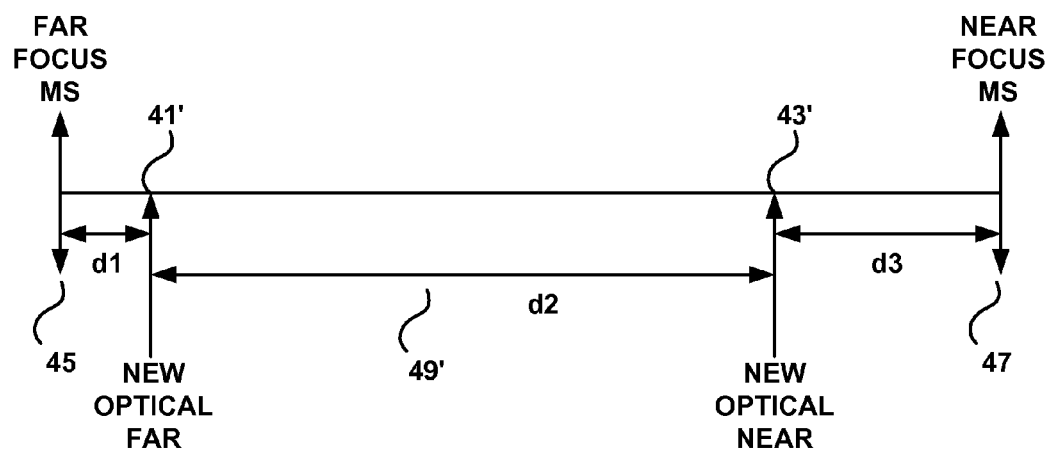
FIG. 5 is a diagram illustrating adjustment of optical far focus and optical near focus lens positions within the auto-focus search range of the lens assembly.

FIG. 5 is a diagram illustrating adjustment of optical far focus and optical near focus bounds 41, 43 within auto-focus search range 49 of lens assembly 12. Upon completion of the auto-focus calibration process for either the far focus condition or the near focus condition, focus control module 26 may adjust the search range stored in search memory 28. For example, focus control module 26 may adjust the optical far focus bound 41 of the existing search range 49, or adjust the optical near focus bound 43 of the existing search range, based on the selected lens position and the applicable focus condition, i.e., near focus condition or far focus condition. In each case, focus control module 26 may use the lens position producing the best focus value to adjust the near focus bound or far focus bound. The lens positions and optical focus bounds may be expressed in terms of actuator drive values. The example of FIG. 5 shows the result of both far and near focus adjustments to produce a new optical far focus bound 41' and a new optical near focus bound 43'. The new focus bounds 41', 43' define a new auto-focus lens position search range 49' for use in the auto-focus process performed by auto-focus module 22. As shown in FIG. 5, the adjustments to define the new search range 49' also may result in adjustments to distances d1, d2 and d3.

Figure 6:
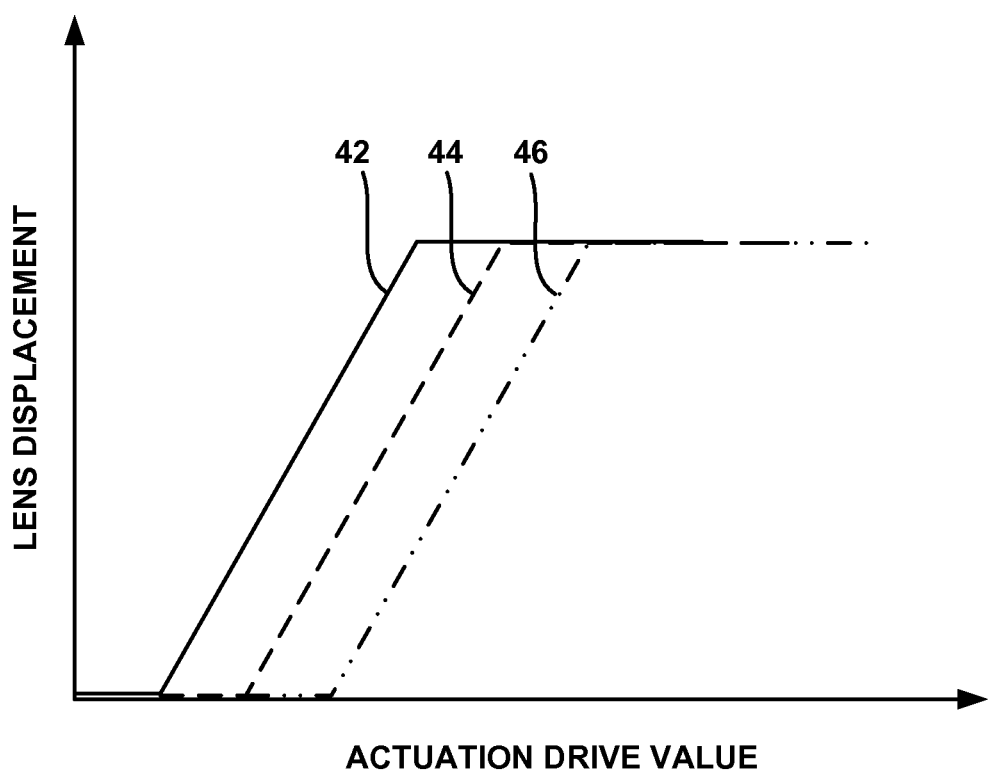
FIG. 6 is a graph showing lens displacement as a function of actuation drive value for an example lens assembly and lens actuator module.

FIG. 6 is a graph showing lens displacement as a function of actuation drive value for an example lens assembly 12. As mentioned above, auto-focus module 22 may express lens position in terms of drive values that cause lens actuation module 20 to move the lens in lens assembly 12. For example, a range of drive values may be applied to lens actuation module 20 to cause the lens to move to different positions within a range of positions between far MS 45 and near MS 47. Because the absolute lens position associated with each drive value is not actually known, focus control module 26 and search range memory 28 may index the lens positions in terms of the drive values. Similarly, focus control module 26 may define optical far focus bound 41, optical near focus bound 43 and other lens positions within search range 49 in terms of drive values that are applied to produce move the lens to those position. Accordingly, the terms positions and drive values may be used somewhat interchangeably in this disclosure.

In the example of FIG. 6, curves 42, 44 and 46 illustrate the amount of lens displacement, e.g., relative to the near focus MS, in response to a range of drive values applied by auto-focus module 22 to lens actuation module 20 when image capture device 10 is held in different orientations. Curve 42 illustrates lens displacement versus drive value applied to lens actuation module 20 when the major image-incident surface of the lens is facing down. Curve 44 illustrates lens displacement versus drive value applied to lens actuation module 20 when the major image-incident surface of the lens is facing in a horizontal direction. Curve 42 illustrates lens displacement versus drive value applied to lens actuation module 20 when the major image-incident surface of lens is facing down.

The drive values may correspond to electrical current levels applied to lens actuation module 20. For example, the current levels may be applied to a voice coil motor, a stepper motor, a piezoelectric actuator, or another type of actuator. Initial current may be the minimum current level necessary to move the lens off of its home position, taking into account that the optical near focus bound may not be the same as the near focus MS. If a lens module comprising lens assembly 12 and lens actuation module 20 were pre-calibrated at the factory, d1, d2, d3, and the initial current levels for up, down and horizontal orientations would be written into nonvolatile memory to aid in the auto-focus process. However, lens modules often are not pre-calibrated. When lens modules are not pre-calibrated, or when post-calibration is desired, an auto-focus calibration process in accordance with various aspects of this disclosure may be desirable in an image capture device 10.

Figure 7:
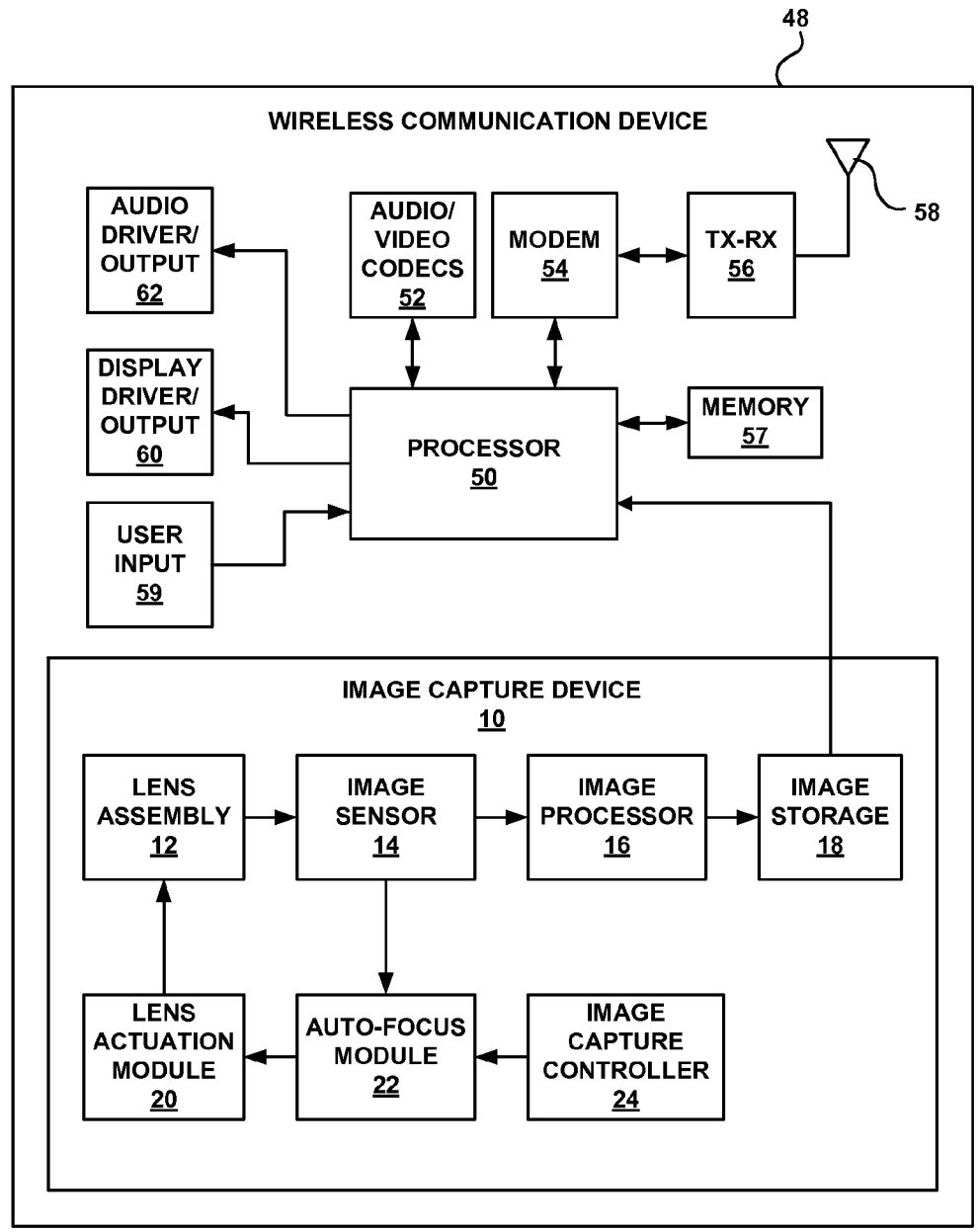
FIG. 7 is a block diagram illustrating an example of a wireless communication device including the image capture device of FIG. 1.

FIG. 7 is a block diagram illustrating an example of a wireless communication device 48 including an image capture device 10 as shown in FIG. 1. As mentioned above, image capture device 10 may be provided within a wireless communication device 48 such as a mobile radiotelephone to form a so-called camera phone or video phone. In this aspect of the disclosure, as shown in FIG. 7, wireless communication device 48 may include various components of image capture device 10 as well as various components to support wireless communication and user interface features. For example, wireless communication device 48 may include a processor 50, audio/video encoders/decoders (CODECs) 52, memory 53, modem 54, transmit-receive (TX/RX) unit 56, memory 57, radio frequency (RF) antenna 58, user input device 59, display driver/output device 60, and audio driver/output device 62.

Image storage device 18 of image capture device 10 may store images or video locally on wireless communication device 48, e.g., for retrieval by a user for viewing, printing, display or transfer to another device such as a personal computer. For example, processor 50 may control a display driver and associated display output 60 and an audio driver and associated audio output 62 to present images, video and associated sounds to the user via a display and speaker associated with the wireless communication device 48. Memory 57 may store instructions for execution by processor 50 to support various operations. User input device 59 may include any of a variety of input media such as keys, buttons, touchscreen media or the like for the user to control operation of wireless communication device 48. User input device 59 may also include a speech input such as a microphone or the like, which may be the same device used to obtain audio in conjunction with still photo or video imagery, or a separated device. Wireless communication device 48 may include speech or voice coding and decoding units.

The images and audio and imagery or video may be encoded by audio/video CODECs 52 for storage and transmission. Audio/video CODECs 52, in some aspects, may reside within image capture device 10. In the example of FIG. 7, audio/video CODECs may reside with the larger wireless communication device 48 to handle a variety of audio and video applications, in addition to audio and video that may be captured by image capture device 10. Audio-video CODECs may encode images or video according to any of a variety of encoding techniques or formats, such as MPEG-2, MPEG-4, ITU H.263, ITU H.264, JPEG, or the like.

In addition, in some aspects, wireless communication device 48 may encode and transmit such audio, images or video to other devices by wireless communication, as well as receive audio, images or video from other devices and encode it. For example, modem 54 and TX-RX unit 56 may be used to transmit encoded audio and image or video information to other wireless communication devices via 58. Device 48 also may transmit and receive speech information. Modem 54 may modulate the encoded information for transmission over the air interface provided by TX-RX unit 56 and antenna 58. In addition, TX-RX unit 56 and modem 54 may process signals received via antenna 58, including encoded audio, imagery or video. TX-RX unit 56 may further include suitable mixer, filter, and amplifier circuitry to support wireless transmission and reception via antenna 58.

Figure 8:
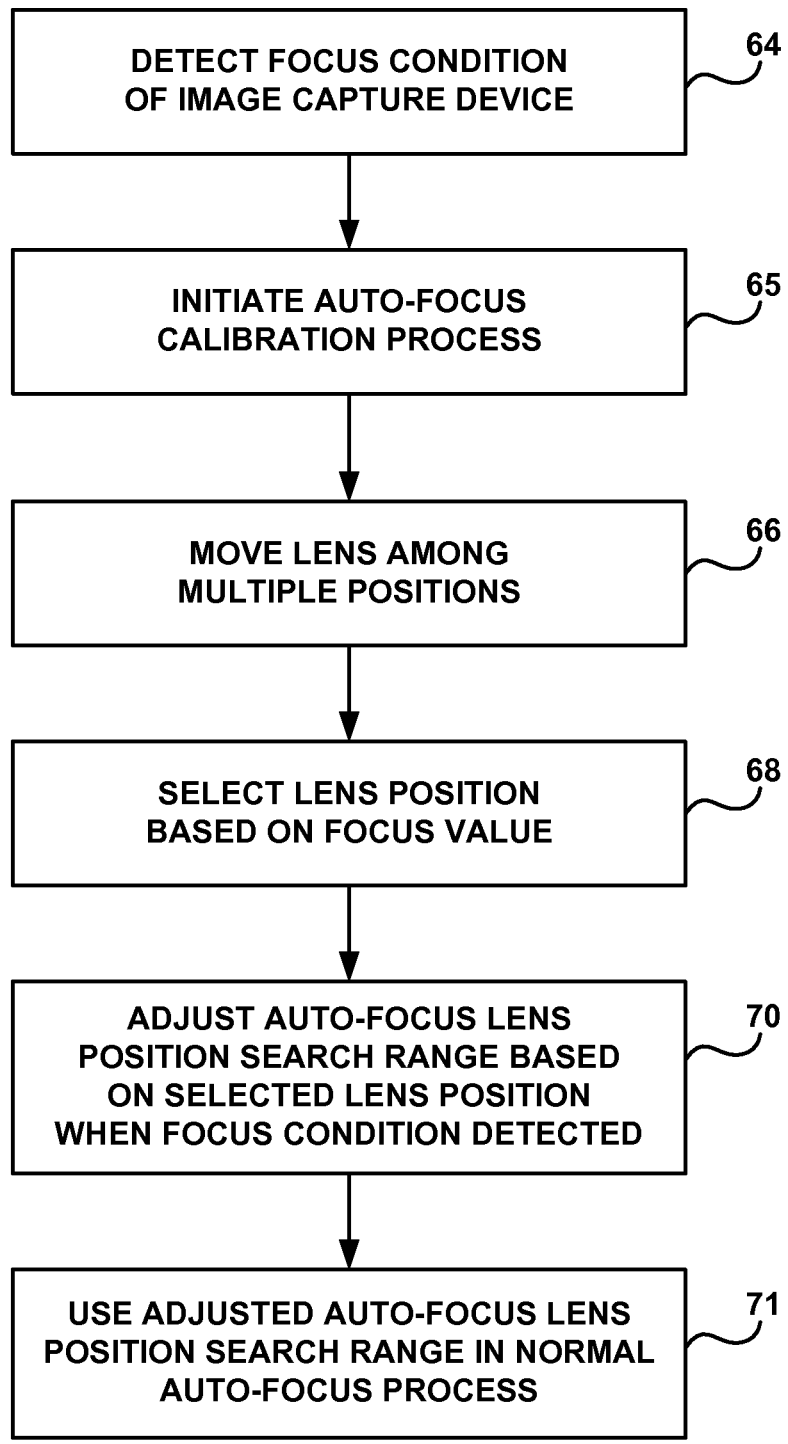
FIG. 8 is a flow diagram illustrating an example of a method for adjusting an auto-focus search range of a lens assembly for auto-focus calibration.

FIG. 8 is a flow diagram illustrating an example of a method for adjusting an auto-focus search range of a lens assembly 12 for auto-focus calibration. As shown in the example of FIG. 8, auto-focus module 22 detects a focus condition of image capture device 12 (64), such as a near focus condition indicated by an indoor environment or a far focus condition indicated by an outdoor environment. In response to detection of a focus condition, auto-focus module 22 initiates the auto-focus calibration process. Again, a focus condition may be detected based on detection of an indoor or outdoor scene and, optionally, the ability to focus on an object in the scene with confidence, e.g., as indicated by a reliable focus value. Auto-focus module 22 controls lens actuation module 20 to move the lens in lens assembly 22 to multiple positions (66) within a calibration sub-range, which may be defined in close proximity to a near or far focus bound of the existing auto-focus lens position search range, depending on whether the near or far focus condition is detected.

Auto-focus module 22 selects one of the lens positions based on a focus value associated with the lens position (68). Based on the selected lens position for the applicable focus condition, auto-focus module 22 may adjust the auto-focus lens position search range (70). For example, auto-focus module 22 may adjust the near focus bound based on the selected lens position if the near focus condition is detected. Alternatively, auto-focus module may adjust the far focus bound based on the selected lens position if the far focus position is detected. Auto-focus module 22 then may use the adjusted search range (71), produced by the auto-focus calibration process, in the normal auto-focus process performed by image capture device 10 during normal operating modes.

Figure 9:
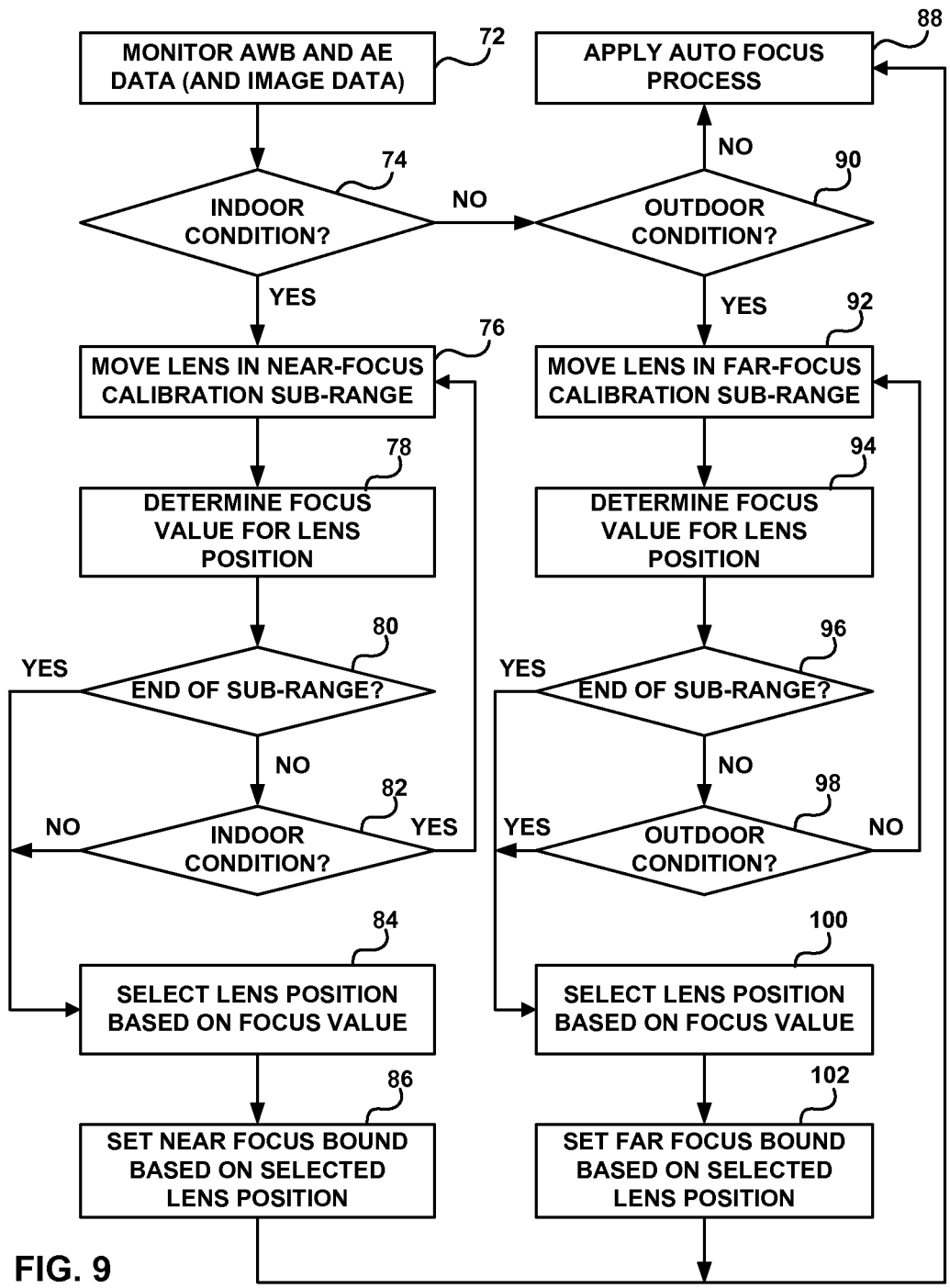
FIG. 9 is a flow diagram illustrating the method of FIG. 8 in greater detail.

FIG. 9 is a flow diagram illustrating the method of FIG. 8 in greater detail. In the example of FIG. 9, focus condition module 32 monitors AWB and AE data obtained from AWB and AE modules of image capture device 10 (72) to determine whether a near focus condition or far focus condition exists. Optionally, focus condition module 32 also may monitor incoming image data from image sensor 14 to detect patterns or objects indicative of a near focus or far focus condition. If the AWB, AE and/or image data indicate an indoor condition (74), focus control module 26 moves the lens to a position in a near focus calibration sub-range (76) and determines a focus value for the lens position (78). In some aspects, focus control module 26 may further require a reliable focus value in addition to detection of the near focus (indoor) condition to trigger the auto-focus calibration process, so that the auto-focus calibration process may proceed with a higher degree of confidence. If the end of the sub-range is reached (80), e.g., all or a specified subset of positions within the sub-range have been considered, then focus control module 26 selects one of the lens positions based on the focus value (84).

If the end of the sub-range has not been reached (80), and the image capture device 10 is still in the indoor condition (82), e.g., as indicated by AWB, AE and/or image data, focus control module 26 moves the lens to another position in the sub-range. The process continues until either the end of the sub-range is reached (80) or the indoor condition no longer applies (82) to image capture device 10. Upon selecting the lens position based on the focus value (84), e.g., selecting the lens position that produce the highest or most optimal focus value, focus control module 26 may set the near focus bound based on the selected lens position (86). For example, the near focus bound may be set to the value of the selected lens position, or may be adjusted as a function of the selected lens position, such as an average of lens positions weighted according to previous selection counts. Auto-focus module 22 then may apply the normal auto-focus process (88) using the search range that has been adjusted as a result of the auto-focus calibration process.

As further shown in FIG. 9, if the outdoor condition is detected (90), focus control module 26 moves the lens to a position in a far focus calibration sub-range (92) and determines a focus value for the lens position (94). Again, in some aspects, focus control module 26 may further require, for heightened confidence, a reliable focus value in addition to detection of the far focus (outdoor) condition in order to trigger the auto-focus calibration process. If the end of the far focus calibration sub-range is reached (96), then focus control module 26 selects one of the lens positions based on the focus value (100). If the end of the sub-range has not been reached (96), and the image capture device 10 is still in the outdoor condition (98), focus control module 26 moves the lens to another position in the sub-range. The process continues until either the end of the sub-range is reached (96) or the outdoor condition no longer applies (98). Upon selecting the lens position based on the focus value (100), focus control module 26 may set the far focus bound based on the selected lens position (102). Auto-focus module 22 then may apply the normal auto-focus process (88) using the search range that has been adjusted as a result of the auto-focus calibration process.

Figure 10:
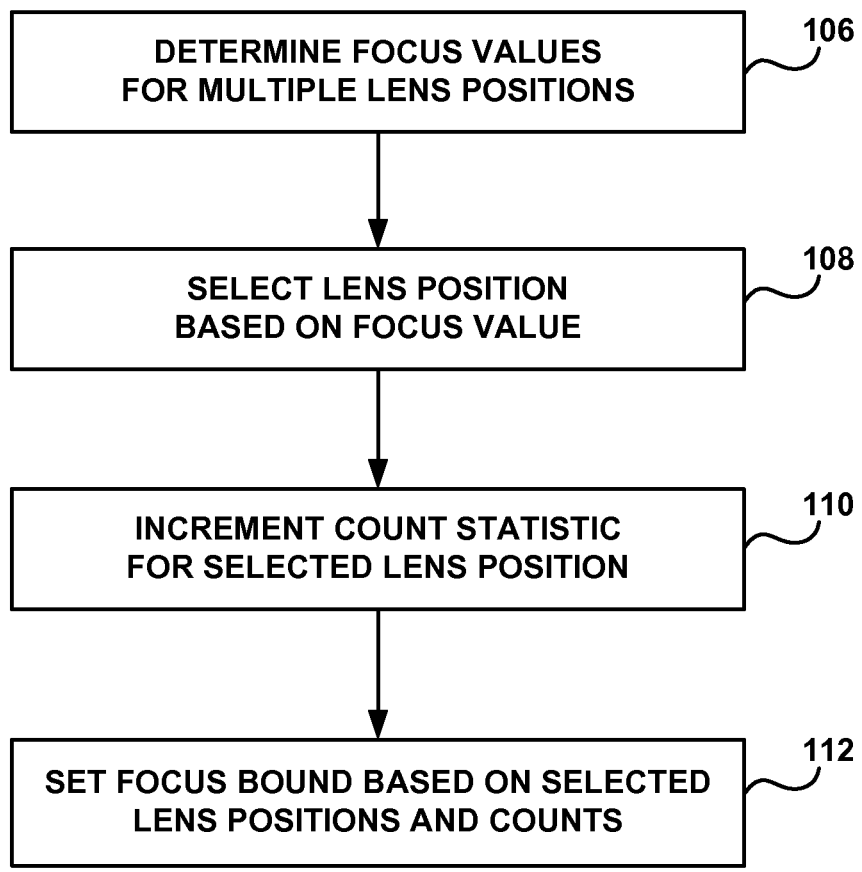
FIG. 10 is a flow diagram illustrating an example of a method for adjusting an auto-focus search range based on lens position statistics.

FIG. 10 is a flow diagram illustrating an example of a method for adjusting an auto-focus search range based on lens position statistics. As shown in FIG. 10, during the auto-focus calibration search range, focus value calculation module 30 determines focus values for multiple lens positions (106). Focus control module 26 selects one of the lens positions based on the focus value (108), and increments a count statistic for the selected lens position (110) to indicate how many times the lens position has been selected in past auto-focus calibration processes. Focus control module 26 then sets the applicable focus bound (near or far) of the search range based on the selected lens positions and associated counts (112). For example, as described above, focus control module 26 may calculate a weighted average of selected lens positions using the counts as a weighting factor.

In some aspects, auto-focus module 22 may be configured to examine the quality of collected statistics data, and reject bad statistics if necessary. If an unsupervised auto-focus calibration technique relied on poor quality or anomalous statistics, the quality of the calibration result could be compromised. Accordingly, if poor quality statistics are detected, in some aspects, auto-focus module 22 may reject the data and not add it to the collected statistics. In addition, in this case, auto-focus module 22 may not trigger the recalibration of the search range. Alternatively, or additionally, if poor quality statistics are detected, auto-focus module 22 may reset or restart the auto-focus calibration process. For example, auto-focus module 22 may reset the search range according to default optical near and far focus bounds, flush the collected statistics from memory, and restart the process.

To detect poor quality statistics, auto-focus module 22 may analyze the collected statistics and/or newly obtained data. Based on characteristics of the data, auto-focus module 22 may generate a confidence value indicating the relative confidence in the quality of the statistics. The confidence value may be a function of various statistical measures such as mean, variance, standard deviation or other measures. As one simple example, if statistical analysis reveals that selected lens positions for the near or far focus bound are wildly divergent and include lens positions situated at substantial distances from one another, the confidence value may be relatively low.

In this case, auto-focus module 22 may reset and restart the auto-focus calibration process or suspend the process. In some aspects, auto-focus module 22 may trigger presentation of a message requesting user intervention to assist in establishing optical near and far focus bounds. For example, the user may be asked to place image capture device 12 in an outdoor environment or indoor environment to aid in recalibrating the auto-focus search range. Also, to avoid spurious results, auto-focus module 22 may require multiple selections of a particular lens position before using the lens position to update the applicable focus bound of the auto-focus lens position search range. Other techniques for processing the statistical data to evaluate recalibration confidence may be applied. Accordingly, the examples in this disclosure should be considered non-limiting.

The techniques described herein may be implemented in hardware, software, firmware, or any combination thereof Any features described as modules or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices.

Various aspects have been described. These and other aspects are within the scope of the following claims.

The invention claimed is:

1. A method of calibrating an image capture device by storing an auto-focus lens position search range, the method comprising:
   providing a lens module of the image capture device, the lens module comprising a lens and a lens actuator;
   detecting a focus condition of an image capture device;
   moving the lens among multiple lens positions;
   selecting one of the multiple lens positions when the focus condition is detected, based on a focus value, as a selected lens position;
   adjusting an auto-focus lens position search range based on the selected lens position;
   calibrating the search range according to the characteristics of the lens assembly; and
   storing, in the image capture device, the adjusted auto-focus lens position search range.

2. The method of claim 1, wherein the focus condition is a first focus condition, the method further comprising:
   detecting a second focus condition of the image capture device; and
   adjusting the auto-focus lens position search range based on the selected lens position when the second focus condition is detected.

3. The method of claim 2, wherein the first focus condition is a focus condition associated with an indoor environment, and the second focus condition is a focus condition associated with an outdoor environment.

4. The method of claim 3, further comprising:
adjusting a first bound of the auto-focus lens position search range when the first focus condition is detected; and
adjusting a second bound of the auto-focus lens position search range when the second focus condition is detected,
wherein the first bound corresponds to a near focus lens position and the second bound corresponds to a far focus lens position.

5. The method of claim 4, wherein moving the lens of the image capture device among multiple lens positions comprises:
moving the lens among multiple lens positions between a near focus mechanical stop of the lens and the second bound when the first focus condition is detected; and
moving the lens among multiple lens positions between the first bound and a far focus mechanical stop of the lens when the second focus condition is detected.

6. The method of claim 5, further comprising:
reducing the auto-focus lens position search range when the selected lens position is greater than the first bound or less than the second bound; and
increasing the auto-focus lens position search range when the selected lens position is greater than the second bound or less than the first bound.

7. The method of claim 1, further comprising determining a number of times the selected lens position has previously been selected; and adjusting the auto-focus lens position search range based on the number of times the selected lens position has previously been selected.

8. The method of claim 1, wherein the focus value includes a sharpness value of an image produced by the image capture device when the lens is at the selected position.

9. The method of claim 1, further comprising detecting the focus condition based on at least one of white balance data and exposure data of the image capture device.

10. The method of claim 1, further comprising detecting the focus condition based on recognition of one or more objects in an image produced by the image capture device.

11. The method of claim 1, further comprising storing the selected lens position as a drive value for a lens actuation module that moves the lens.

12. The method of claim 1, wherein the auto-focus lens position search range is bound by near focus and far focus bounds.

13. The method of claim 1, further comprising using the auto-focus lens position search range in a subsequent auto-focus process.

14. The method of claim 1, wherein the selected lens position corresponds to an optimal position to capture an image based on the focus value.

15. The method of claim 1, wherein the moving comprises moving the lens of the image capture device among multiple lens positions within the auto-focus lens position search range.

16. A non-transitory computer-readable storage medium comprising instructions that when executed cause one or more processors to:
detect a focus condition of an image capture device;
control movement of a lens of the image capture device among multiple lens positions;
select one of the multiple lens positions when the focus condition is detected, based on a focus value, as a selected lens position;
adjust an auto-focus lens position search range based on the selected lens position; and
store, in the image capture device, the adjusted auto-focus lens position search range.

17. The non-transitory computer-readable storage medium of claim 16, wherein the focus condition is a first focus condition, the instructions further comprising instructions to cause one or more processors to:
detect a second focus condition of the image capture device; and
adjust the auto-focus lens position search range based on the selected position when the second focus condition is detected.

18. The non-transitory computer-readable storage medium of claim 17, wherein the first focus condition is a focus condition associated with an indoor environment, and the second focus condition is a focus condition associated with an outdoor environment.

19. The non-transitory computer-readable storage medium of claim 18, wherein the instructions further comprising instructions to cause one or more processors to:
adjust a first bound of the auto-focus lens position search range when the first focus condition is detected; and
adjust a second bound of the auto-focus lens position search range when the second focus condition is detected,
wherein the first bound corresponds to a near focus lens position and the second bound corresponds to a far focus lens position.

20. The non-transitory computer-readable storage medium of claim 19, the instructions further comprising instructions to cause one or more processors to:
control movement of the lens among multiple lens positions between a near focus mechanical stop of the lens and the second bound when the first focus condition is detected; and
control movement of the lens among multiple lens positions between the first bound and a far focus mechanical stop of the lens when the second focus condition is detected.

21. The non-transitory computer-readable storage medium of claim 20, the instructions further comprising instructions to cause one or more processors to:
reduce the auto-focus lens position search range when the selected lens position is greater than the first bound or less than the second bound; and
increase the auto-focus lens position search range when the selected lens position is greater than the second bound or less than the first bound.

22. The non-transitory computer-readable storage medium of claim 16, the instructions further comprising instructions to cause one or more processors to determine a number of times the selected lens position has previously been selected, and adjust the auto-focus lens position search range based on the number of times the selected lens position has previously been selected.

23. The non-transitory computer-readable storage medium of claim 16, wherein the focus value includes a sharpness value of an image produced by the image capture device when the lens is at the selected position.

24. The non-transitory computer-readable storage medium of claim 16, the instructions further comprising instructions to cause one or more processors to detect the focus condition based on at least one of white balance data and exposure data of the image capture device.

25. The non-transitory computer-readable storage medium of claim 16, the instructions further comprising instructions to cause one or more processors to detect the focus condition based on recognition of one or more objects in an image produced by the image capture device.

26. The non-transitory computer-readable storage medium of claim 16, the instructions further comprising instructions to cause one or more processors to store the selected lens position in memory as a drive value for a lens actuation module.

27. A method comprising:
    detecting a focus condition of an image capture device;
    moving a lens of the image capture device among multiple lens positions;
    selecting one of the lens positions based on a focus value as a selected lens position;
    storing the selected lens position as a drive value for a lens actuation module that moves the lens; and
    adjusting an auto-focus lens position search range based on the selected lens position when the focus condition is detected.

28. The method of claim 27, further comprising using the stored drive value to move the lens in an auto-focus process.

29. The method of claim 27, further comprising using the auto-focus lens position search range in a subsequent auto-focus process.

30. The method of claim 27, wherein the selected lens position corresponds to an optimal position to capture an image based on the focus value.

31. The method of claim 27, wherein the auto-focus lens position search range is bound by near focus and far focus bounds.

32. The method of claim 27, wherein the moving comprises moving the lens of the image capture device among multiple lens positions within the auto-focus lens position search range.

33. The method of claim 27, wherein the image capture device comprises a mobile phone, and wherein the method is performed in the mobile phone.

34. A method comprising:
    detecting a first focus condition of an image capture device;
    detecting a second focus condition of the image capture device;
    moving a lens of the image capture device among multiple lens positions;
    selecting one of the lens positions based on a focus value as a selected lens position;
    adjusting an auto-focus lens position search range based on an auto-focus calibration process, wherein a near focus bound of the search range is adjusted when the first focus condition is detected and a far focus bound of the search range is adjusted when the second focus condition is detected;
    adjusting the auto-focus lens position search range based on the selected lens position when the first focus condition is detected; and
    adjusting the auto-focus lens position search range based on the selected lens position when the second focus condition is detected,
    wherein the first focus condition is a focus condition associated with an indoor environment, and the second focus condition is a focus condition associated with an outdoor environment.

35. The method of claim 34, further comprising using the auto-focus lens position search range in a subsequent auto-focus process.

36. The method of claim 34, wherein the image capture device comprises a video camera.

37. The method of claim 34, wherein the image capture device comprises a mobile computing device, and wherein the method is performed in the mobile computing device.

* * * * *